(12) United States Patent
Hsu et al.

(10) Patent No.: US 7,840,701 B2
(45) Date of Patent: *Nov. 23, 2010

(54) DYNAMIC SYSTEM AND METHOD FOR VIRTUAL PRIVATE NETWORK (VPN) PACKET LEVEL ROUTING USING DUAL-NAT METHOD

(75) Inventors: Nai-Ting Hsu, Saratoga, CA (US);
Junzheng Zhang, Beijing (CN);
Zhuoyuan Chai, Beijing (CN); Leemay Yen, San Jose, CA (US); Pu-Chau Hsu, Saratoga, CA (US)

(73) Assignee: Array Networks, Inc., Milpitas, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 11/709,927

(22) Filed: Feb. 21, 2007

(65) Prior Publication Data
US 2008/0201486 A1 Aug. 21, 2008

(51) Int. Cl.
*G06F 15/173* (2006.01)
*G06F 15/16* (2006.01)
(52) U.S. Cl. .................. 709/238; 709/245; 370/401
(58) Field of Classification Search ............. 709/238, 709/245; 726/15; 370/401
See application file for complete search history.

(56) References Cited

U.S. PATENT DOCUMENTS 6,804,777 B2   10/2004   Hollis et al.
6,816,882 B1   11/2004   Conner et al.
7,185,106 B1*  2/2007   Moberg et al. ............. 709/238
7,315,888 B2*  1/2008   Shibata ...................... 709/223
2002/0186698 A1* 12/2002 Ceniza ........................ 370/401

(Continued)

OTHER PUBLICATIONS

Wikipedia, Network Address Translation, Jul. 2006.*
PC Magazine, Node Definition from PC Magazine Encyclopedia, Jul. 2009.*
R. Droms, "RFC 2131: Dynamic Host Configuration Protocol,"Mar. 1997, Network Working Group, p. 1-46.
P. Mockapetris, "RFC 1035; Domain Names—Implementation and Specification, "Nov. 1987, Network Working Group, p. 1-56.
P. Mockapetris, "RFC 1034; Domain Names Concepts and Facilities," Nov. 1987, pp. 1-55.

*Primary Examiner*—Nathan Flynn
*Assistant Examiner*—James E Conaway
(74) *Attorney, Agent, or Firm*—Buchanan Ingersoll & Rooney PC

(57) ABSTRACT

A system and method for virtual private network (VPN) packet level routing using a Dual-NAT architecture to provide a bi-directional secure connection between applications, hosts, or networks at any two end sites without exposing each other's actual IP addresses and network topologies. The method includes providing a client a list of available resources on a remote network; initiating a request by the client for at least one resource from the list of available remote resources as though the at least one resource is local to the client; NATting the source and destination IP addresses to a pair of client and resource Dynamic VPN (DVPN) addresses; routing the request to the remote network; NATting the client and resource DVPN addresses to local IP addresses on the remote network; issuing the request to the at least resource; and NATting/routing the response using the reverse process.

20 Claims, 12 Drawing Sheets

U.S. PATENT DOCUMENTS

| | | |
|---|---|---|
| 2003/0185207 A1* | 10/2003 | Nakahara .................... 370/389 |
| 2004/0162992 A1 | 8/2004 | Sami et al. |
| 2004/0209613 A1 | 10/2004 | Hunter et al. |
| 2004/0218611 A1 | 11/2004 | Kim |
| 2004/0249974 A1* | 12/2004 | Alkhatib et al. ............ 709/245 |
| 2004/0268148 A1 | 12/2004 | Karjala et al. |
| 2005/0088977 A1 | 4/2005 | Roch et al. |
| 2005/0190705 A1 | 9/2005 | Moore et al. |
| 2005/0198491 A1 | 9/2005 | Lee et al. |
| 2005/0273849 A1 | 12/2005 | Araujo et al. |
| 2006/0227758 A1 | 10/2006 | Rana et al. |
| 2007/0081530 A1* | 4/2007 | Nomura et al. ............. 370/389 |
| 2007/0153782 A1* | 7/2007 | Fletcher et al. ............ 370/389 |
| 2008/0082640 A1* | 4/2008 | Chang et al. ............... 709/220 |
| 2008/0144625 A1* | 6/2008 | Wu et al. .................... 370/392 |

* cited by examiner

|  | Client Site Packet | NAT on DVPN Gateway B (60) | Tunnel (90) | NAT on DVPN Gateway A (30) | Resource Site Packet |
|---|---|---|---|---|---|
| Source IP: Port | 10.2.0.10:2000 | 10.2.0.10:2000 ==> 198.2.0.10:2000 (Assign a Client DVPN address) | Natted IP packets as payload in tunnel 198.0.10:2000 | 198.2.0.10:2000 ==> 10.1.0.101:10001 (10.1.0.101 is a reserved IP and 10001 is a selected unique port number) | 10.1.0.101: 10001 |
| Destination IP:Port | 10.2.0.100:8080 (Virtual Web1 IP & Port) | 10.1.0.100:8080 ==> 198.1.0.200:80 (Resource DVPN address) | 198.1.0.200:80 | 198.1.0.200:80 ==> 10.1.0.200:80 (10.1.0.200 is resource Web1 IP address) | 10.1.0.200: 80 |

FIG. 4

|  | Client Site Packet | NAT on DVPN Gateway B (60) | Tunnel (90) | NAT on DVPN Gateway A (30) | Resource Site Packet |
|---|---|---|---|---|---|
| Source IP: Port | 10.2.0.10:2000 | 10.2.0.10:2000 ==> 198.2.0.10:2000 (Assign a Client DVPN address) | Natted IP packets as payload in tunnel 198.2.0.10:2000 | 198.2.0.10:2000 ==> 10.1.0.102:2000 (10.1.0.102 is a newly selected IP adderss for the Client) | 10.1.0.102: 2000 |
| Destination IP:Port | 10.2.0.100:8080 (Virtual Web1 IP & Port) | 10.2.0.100:8080 ==> 198.1.0.200:80 (Resource DVPN address) | 198.1.0.200:80 | 198.1.0.200:80 ==> 10.1.0.200:80 (10.1.0.200 is resource Web1 IP address) | 10.1.0.200: 80 |

FIG. 5

| | Client Site Packet | NAT on DVPN Gateway B (60) | Tunnel (90) | NAT on DVPN Gateway A (30) | Resource Site Packet |
|---|---|---|---|---|---|
| Control Connection Source IP: Port | 10.2.0.10:1026 | 10.2.0.10:1026 ==> 198.2.0.10:1026<br><br>(Assign a Client DVPN address) | Natted IP packets as payload in tunnel<br><br>198.2.0.10:1026 | 198.2.0.10:1026 ==> 10.1.0.101:15000<br><br>(10.1.0.101 is a reserved IP and 15000 is a selected unique port number) | 10.1.0.101: 15000 |
| Control Connection Destination IP: Port | 10.2.0.100:21<br><br>(Virtual ftp1 IP & Port) | 10.2.0.100:21 ==> 198.1.0.200:21<br><br>(FTP Server DVPN address) | 198.1.0.200:21 | 198.1.0.200:21 ==> 10.1.0.200:21<br><br>(10.1.0.200:21 is real ftp server IP address) | 10.1.0.200: 21 |

FIG. 8

|  | Client Site | NAT on DVPN Gateway B (60) | Tunnel (90) | NAT on DVPN Gateway A (30) | Resource Site |
|---|---|---|---|---|---|
| IP & Port in PORT Command | 10.2.0.10:1027 | 10.2.0.10:1027 ==> 198.2.0.10:1027 (Waiting for packets to destination 198.2.0.10:1027 from resource 198.1.0.200) | | 198.2.0.10:1027 ==> 10.1.0.101:15001 (10.1.0.101 is a reserved IP, 15001 is a unique port number for the client) (Record 198.2.0.10:1027 and relate it to control connection 198.1.0.200:21) (Listening on 10.1.0.101:15001, waiting for connection setup from real server) | 10.1.0.101: 15001 |

FIG. 9

|  | Client Site Packet | NAT on DVPN Gateway B (60) | Tunnel (90) | NAT on DVPN Gateway A (30) | Resource Site Packet |
|---|---|---|---|---|---|
|  | ← | | | | |
| Data Connection Source IP | 10.2.0.100:20 | 198.1.0.200:20 ==> 10.2.0.100:20 | Natted IP packets as payload in tunnel 198.1.0.200:20 | 10.1.0.200:20 ==> 198.1.0.200:20 | 10.1.0.200: 20 |
| Data Connection Destination IP | 10.2.0.10:1027 | 198.2.0.10:1027 ==> 10.1.0.10:1027 (DVPN Gateway B can distinguish this connection since it is waiting for the 198.2.0.10:1027) | 198.2.0.10:1027 | 10.1.0.101:15001 ==> 198.2.0.10:1027 (DVPN Gateway A listens on 10.1.0.101: 15001 and relates to DVPN address 198.2.0.10:1027) | 10.1.0.101: 15001 |

FIG. 10

| | Client Site Packet | NAT on DVPN Gateway B (60) | Tunnel (90) | NAT on DVPN Gateway A (30) | Resource Site Packet |
|---|---|---|---|---|---|
| Control Connection Source IP: Port | 10.2.0.10:1026 | 10.2.0.10:1026 ==> 198.2.0.10:1026 (Assign a Client DVPN address) | Natted IP packets as payload in tunnel 198.2.0.10:1026 | 198.2.0.10:1026 ==> 10.1.0.101:15000 (10.1.0.101 is a reserved IP and 15000 is a selected unique port number) | 10.1.0.101: 15000 |
| Control Connection Dst IP: Port | 10.2.0.100:21 (Virtual ftp1 IP & Port) | 10.2.0.100:21 <==> 198.1.0.200:21 (FTP Server DVPN address) | 198.1.0.200:21 | 198.1.0.200:21 ==> 10.1.0.200:21 (10.1.0.200:21 is real ftp server IP address) | 10.1.0.200: 21 |

FIG. 12

|  | Client Site | NAT on DVPN Gateway B (60) | Tunnel (90) | NAT on DVPN Gateway A (30) | Resource Site |
|---|---|---|---|---|---|
|  | ← | | | | |
| IP & Port in PORT Command | 10.2.0.100:2024 | 198.1.0.200:2024 ==> 10.2.0.100:2024<br><br>(10.2.0.100 is virtual ftp server IP.)<br><br>(Record 10.2.0.100:2024 relating to 10.2.0.100:21 control connection channel.)<br><br>(Listening on 10.2.0.100:2024 from Client) | | 10.1.0.200:2024 ==> 198.1.0.200:2024<br><br>(Waiting for packets to 198.1.0.200:2024 from Client)<br><br>(Record 10.1.0.200:2024 relating to 10.1.0.200:21) | 10.1.0.200: 2024 |

FIG. 13

| | Client Site Packet | NAT on DVPN Gateway B (60) | Tunnel (90) | NAT on DVPN Gateway A (30) | Resource Site Packet |
|---|---|---|---|---|---|
| Data Connection Source IP | 10.2.0.10:1027 | 10.2.0.10:1027 ==> 198.2.0.10:1027 (Assign a Client DVPN address) | Natted IP packets as payload in tunnel 198.2.0.10:1027 | 198.2.0.10:1027 ==> 10.1.0.101:15001 (10.1.0.101 is a reserved IP and 15001 is a selected unique port number) | 10.1.0.101: 15001 |
| Data Connection Destination IP | 10.2.0.100:2024 | 10.2.0.100:2024 ==> 198.1.0.200: 2024 (FTP Server DVPN address) | 198.1.0.200: 2024 | 198.1.0.200:2024 ==> 10.1.0.200:2024 (DVPN Gateway A can distinguish this connection since it waiting for the connection on 198.1.0.200.2024) | 10.1.0.200: 2024 |

FIG. 14

DYNAMIC SYSTEM AND METHOD FOR VIRTUAL PRIVATE NETWORK (VPN) PACKET LEVEL ROUTING USING DUAL-NAT METHOD

FIELD OF THE INVENTION

This invention generally relates to a system and method for virtual private network (VPN) packet level routing using a dual-NAT architecture for a Dynamic VPN (DVPN) system, and more particularly to a system and method which utilizes DVPN gateways to provide a bi-directional secure connection between applications, hosts, or networks at any two end sites without exposing each other's IP addresses and network topologies.

BACKGROUND

One of the most utilized networks for interconnecting distributed computer systems is the Internet. The Internet allows users of computer systems to exchange data throughout the world. In addition, many private networks in the form of corporate or commercial networks are connected to the Internet. These private networks are typically referred to as an "intranet." To facilitate data exchange, the intranet generally uses the same communications protocols as the Internet. These Internet protocols (IP) dictate how data is formatted and communicated. In addition, access to corporate networks or intranets can be controlled by network gateways, which can include a firewall system.

As the popularity of the Internet grew, businesses turned to it as a means of extending their own networks. First came the intranet, which was an access-controlled site designed for use only by company employees. Now, many companies are creating their own VPN (virtual private network) to accommodate the needs of remote employees and distant offices. The VPN is generally a private network that uses a public network (usually the Internet) to connect remote sites or users together. Instead of using a dedicated, real-world connection such as a leased line, a VPN uses "virtual" connections routed through the Internet from the company's private network to the remote site or employee.

In a typical configuration, a local network uses one of the designated "private" IP address subnets (such as 192.168.x.x, 10.x.x.x or 172.16.x.x-172.31.x.x), and a router on that network has a private address (such as 192.168.0.1) in that address space. The router is also connected to the Internet with a single "public" address or multiple "public" addresses assigned by an ISP. As traffic passes from the local network to the Internet, the source address in each packet is translated on the fly from the private addresses to the public address(es). The router tracks basic data about each active connection (particularly the destination address and port). When a reply returns to the router, it uses the connection tracking data it stored during the outbound phase to determine where on the internal network to forward the reply.

The typical virtual private network gateway or device includes a secure communications over an open and typically insecure network such as the Internet. In order to establish secure communication between any two nodes on a virtual private network (VPN), each node obtains by some means information ("configuration") including but not limited to: the identity and state of the remote nodes within the VPN, the relationships between nodes (VPN topology), and cryptography for authentication and data communications encryption between nodes. The secured communication between the two nodes is commonly called a "tunnel", while the nodes themselves are often referred to as "tunnel terminators." The traditional VPN solutions are comprised of a number of tunnel termination devices, which provide a central "hub" for VPN communication. Software is then deployed to nodes that wish to participate in a VPN, and the software is configured manually with the address of the VPN device(s), which is then executed in order to participate in the VPN. The traditional VPN solution exposes the internal network topologies of the two end VPN nodes. The client (requestor) and the resource (service) communicate with each other using their local IP addresses on their own VPN nodes respectively.

Accordingly, it would be desirable to have an application to application system, which can deploy any resources (services) and those application level content can be routed through a virtual private network tunnel using a dual-NAT method, which does not disclose the local internal network topology, and can be easily deployed because the system and method allows IP address or subnet conflict between two end sites.

SUMMARY OF THE INVENTION

In accordance with one embodiment, a method for virtual private network packet level routing using a dual-NAT (network address translation) mechanism comprising: providing at least one client on a client virtual private network node a list of available resources hosted on a resource virtual private network node; assigning the at least one resource on the resource virtual private network node a local (virtual) IP address on the client virtual private network node; initiating a request by the at least one client for the at least one resource from the list of available resources hosted on the resource virtual private network node as though the at least one resource is local to the at least one client without exposing the actual IP addresses of the list of available resources on the resource virtual private network node, wherein a client dynamic virtual private network (DVPN) gateway associated with the client virtual private network node translates the local (actual) client IP address and the local (virtual) resource IP address into a client DVPN address and a resource DVPN address; routing the request packet with the client DVPN address and the resource DVPN address through a secure connection to a resource dynamic virtual private network (DVPN) gateway associated with the resource virtual private network node; translating the client DVPN address and the resource DVPN address to a local (virtual) client IP address and the local (actual) resource IP address on the resource virtual private network node, and wherein the translation is performed by the resource DVPN gateway; responding to the request by the at least one resource on the resource virtual private network node as though the request is initiated locally on the resource virtual private network node without exposing the actual IP address of the at least one client on the client virtual private network node; routing the response packet from the at least one resource on the resource virtual private network node back to the at least one client on the client virtual private network node through the secure connection, wherein the resource DVPN gateway translates the local (actual) resource IP address and the local (virtual) client IP address on the resource virtual private network node to the resource DVPN address and the client DVPN address for routing through the secure tunnel to the client DVPN gateway; and forwarding the response packet to the at least one client, wherein the client DVPN gateway translates the resource DVPN address and the client DVPN address to the local (virtual) resource IP address and the local (actual) client IP address on the client virtual private network node.

BRIEF DESCRIPTION OF THE DRAWINGS

The invention will now be described in greater detail with reference to the preferred embodiments illustrated in the accompanying drawings, in which like elements bear like reference numbers, and wherein:

FIG. 4 shows a chart relating to an informational setup of a Network Address Translation (NAT)/Port Address Translation (PAT) Rule for remote resource service deployment between two peer VPN nodes in accordance with one embodiment.

FIG. 5 shows a table relating to NAT Only Rule for the remote resource access packet flow between two peer VPN nodes in accordance with one embodiment.

FIG. 8 shows a table relating to the PORT command packet sending from the Client to the FTP Server.

FIG. 9 shows a table relating to NAT the content of the PORT command packet using Active Mode File Transfer Protocol (FTP).

FIG. 10 shows a table relating to the packet flow from the FTP Server data port to the Client data port.

FIG. 12 shows a table relating to the PASV command packet sending from the Client to the FTP Server.

FIG. 13 shows a table relating to NAT the content of the PORT command packet using Passive Mode File Transfer Protocol (FTP).

FIG. 14 shows a table relating to the packet flow from the Client data port to the FTP Server data port.

DETAILED DESCRIPTION

It can be appreciated that today, many industries and enterprises are looking to simplify and optimize their business operations by increasing employee productivity and business agility while streamlining network management and delivering dramatic cost savings. In order to provide a secure, on-demand access both internally and remotely, virtual private network (VPN) devices (aka gateways) can connect employees with remote applications and information (i.e., resources/services) need to meet the demands of customers, from small, local businesses to large, global enterprises and from financial services and healthcare to government and education. For example, secure access to applications and web-enabled content can be utilized by almost all types of businesses from delivering fast, secure access to administrative and clinical applications and patient records in the healthcare industry, improving customer serving service and services while reducing costs for a financial institution, generating optimum productivity from supply chains and employees for retailers, enabling fast, secure access to administrative and educational applications; providing fast access and iron-clad security for vital operations and data for governmental entities; and the ability to offer fast and secure access and e-mail services, optimum availability and security with streamlined management over the internet.

Web-enabled applications help integrate company systems so they share information and connect employees, suppliers, and administrators to automated business processes. Regardless whether the Internet is being used for financial, supply chain, customer relationship management, or other business critical applications, the essential requirements remain the same: without the appropriate level of performance, availability, and security, applications cannot deliver on promised returns. Moreover, as client and client devices demand greater access to data and services via Web-based or enabled programs, the need for performance, availability, and security enhancing products and solutions has never been greater.

Figure 1:
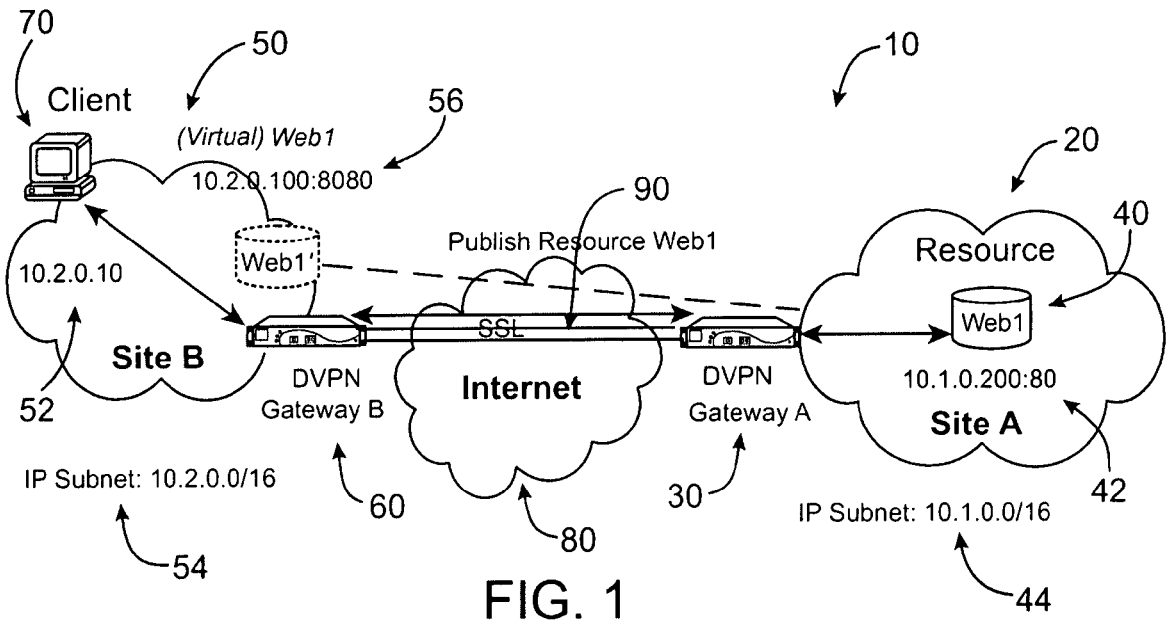
FIG. 1 shows a schematic diagram of a dynamic virtual private network (DVPN) access scenario in accordance with one embodiment of publishing (provisioning) resources configured at one site (the resource site) to another site (the client site).

FIG. 1 shows a schematic diagram of a dynamic virtual private network (DVPN) access scenario or system 10 of publishing (provisioning) resources configured at one site (the resource site) to another site (the client site). In accordance with one embodiment, a complete DVPN access process preferably includes the steps of establishing a secure connection or tunnel 90, publishing at least one resource and routing resource access data packets. The establishment of the secure connection or tunnel 90, preferably includes establishing a secure sockets layer (SSL) connection between a resource virtual private network node 20 (Site A) and a client virtual private network node 50 (Site B), wherein the tunnel 90 is used to transmit control message and transfer data flow. However, it can be appreciated that the system and methods as described herein can be used with any suitable secure connection or tunnel.

The resource virtual private network node 20 (Site A) preferably includes at least one resource 40, such that the resource virtual private network node 20 can publish (or provision) the at least one resource 40, e.g., Web service Web1 (resource name) with a (real) resource IP address, 10.1.0.200:80 (42), to the client virtual private network node 50 (Site B) through the SSL connection 90. In accordance with one embodiment, the client virtual private network node 50 obtains the real resource information and allocates a local IP address, 10.2.0.100 (56), and optionally a new port number, 8080, to this resource using a Dynamic Host Configuration Protocol (DHCP), a pre-configured IP address pool, or whatever suitable methods, such that the at least one remote resource 40 is mapped as a local (virtual) resource on the client virtual private network node 50 (Site B). Typically, the virtual private network node or site which publishes the at least one resource is called (in this case, Site A) the "Resource site" and the virtual private network node or site which receives resources from other site (in this case Site B) as "Client site". It can be appreciated that typically, "Client" refers to the real client and "Resource" refers to the real resource.

As shown in FIG. 1, the system 10 comprises a resource virtual private network node 20 (Site A) having at least one resource 40, and a dynamic virtual private network (DVPN) gateway 30 associated with the resource VPN node 20. The system 10 also includes a client dynamic virtual private network (DVPN) gateway 60 associated with a client VPN node 50 (Site B) having at least one client or client machine 70. The resource and the client DVPN gateways 30, 60 work together to deploy any resource for a client 70 to remote access without disclosing the local internal network topologies of the resource and the client VPN nodes 20, 50. The resource and client virtual private network nodes 20, 50 are preferably configured to securely communicate with one another, using a dynamic virtual private network gateway on each end, via a communication network 80 (i.e., the Internet). Further, it can be appreciated that the client VPN node 50 can be configured to host at least one resource, such that the resource VPN node 20 can also be a client node, and the client node can be utilized as a resource node.

It can be appreciated that the exchange of data between the resource and the client nodes 20, 50 of the network system 10 (FIG. 1), can be between a client or client machine 70 such as a computing device (e.g., a computer, PDA, cell phone, any devices with an embedded CPU/software) and/or an application running on a computing device, and a set of resources (files, services, devices, etc.), which can be identified with an individual name and/or IP address and port number. Each of the nodes 20, 50 preferably include information of a sensitive nature containing, for instance, confidential data on finances, business development plans, or private e-mail.

In accordance with one embodiment, the system 10 can include a system and method for virtual private network (VPN) packet level routing. As shown in FIG. 1, the resource and the client DVPN (dynamic virtual private network) gateways 30, 60 are configured such that applications and other related resources such as e-mail on one VPN node 20, 50 are accessible by the other VPN node 20, 50 in a such a manner that the resources are secure, without disclosing the local network topologies of two VPN nodes, as they are transported or accessed by providing for packet level routing and by providing a method and system for a dynamic dual-NAT source and destination addresses. The resource and the client VPN nodes 20, 50 each include at least one dynamic virtual private network (DVPN) gateway 30, 60 respectively. The DVPN gateways 30, 60 allow the client or client device 70 to make requests and connect to resources on other VPN node, such as resource 40 on the resource virtual private network (VPN) node 20, and receive responses back without knowing the specific IP address and/or network topology of the resource virtual private network (VPN) node 20. In use, the client or client device 70 requests a file, or other resource available on a remote resource VPN node 20. The client DVPN gateway 60 on the client VPN node 50, acting as a virtual resource, will receive the request, and route the request to the remote resource on the resource VPN node 20 via the resource DVPN gateway 30, acting as a virtual client on the resource VPN node 20. The response follows the reverse path. It can be appreciated that in some cases, the DVPN gateways 30, 60 may alter the contents of the client's request or the resource's response for various purposes, such as supporting Microsoft exchange protocol MAP1 and Windows file sharing protocol CIFS which embeds IP addresses and port numbers in their contents.

As shown in FIG. 1, a tunnel 90 is established, over a communication network 80 such as Internet, between the resource VPN node 20 and the client VPN node 50 using a tunneling protocol, which encapsulates one protocol or session inside another. The tunneling protocol preferably includes a suitable protocol, wherein the transmission of data intended for use only within a private, usually corporate network through a public network in such a way that the routing nodes in the public network are unaware that the transmission is part of a private network. It can be appreciated that the tunneling is preferably performed by encapsulating the private network data and protocol information within the public network transmission units so that the private network protocol information appears to the public network as data.

It can be appreciated that in accordance with one embodiment, each of the VPN nodes such as node 50, includes a listing of virtual resources such on the other VPN node 20 within the network system 10. The listing of available resources can be exchanged between nodes 20, 50 using any suitable method of publication (i.e., resource provisioning). For example, the publication of available resources can include a manual importation (or provision) of resources by a node or network administrator and/or dynamically provisioning of resources, wherein the establishment of the tunnel between the resource and the client VPN nodes 20, 50 provides for the exportation of a listing of available resources hosted at the resource VPN node 20, such that the at least one resource can be provisioned for accessing by the clients associated with the client VPN node 50. After the proper resource provisioning, the client DVPN virtual private network gateway 60 interacts with the client 70, on behalf of the remote resource 40, as though the remote resource 40 as a (virtual) resource with a local IP address and port number, 10.2.0.100:8080 (56), on the client VPN node 50. The process can also be applied to provision resources from the client VPN node 50 to the resource VPN node 20.

In accordance with one embodiment, the tunnel 90 is formed using a secure protocol, such as SSL (secure sockets layer) or TLS (transport layer security), which provide secure communications on the Internet for such things as e-mail, Internet faxing, and other data transfers. SSL provides endpoint authentication and communications privacy over the Internet using cryptography.

As shown in FIG. 1, the resource VPN node 20 has a local IP Subnet of 10.1.0.0/16 (44) and the client VPN node 50 has an IP Subnet of 10.2.0.0/16 (54). Each of the VPN nodes 20, 50 includes at least one resource 40, which can be accessed via a resource name such as Web service Web1. In order to remote access at least one resource 40, on the resource VPN node 26 having the IP address and port number 10.1.0.200:80 (42), the client 70, associated with the client VPN node 50 initiates a requests to access the at least one resource 40 via the client DVPN gateway 60 on the client VPN node 50 to establish a preferably secure connection or tunnel 90 over the communication network 80 between the resource VPN node 20 and the client VPN node 50. After proper provisioning, the remote resource 40 has a local name, Web1', and IP address and port number, 10.2.0.100:8080, as a (virtual) resource on the client VPN node 50.

It can be appreciated that in order to maintain network opacity for security, it is preferably that only the minimum data needed for remote accessing the available resources or applications will be exchanged. For example, for remote accessing a resource 40 on the resource VPN node 20, only the resource name is needed. However, it can be appreciated that an application port number and/or a unique identifier or IP address may also be needed. It can be appreciated that other suitable protocol or rules to allow the DVPN gateway to request and obtain a local IP address, for the remote resource, from the client virtual private network node 50, can apply. Each time a request from the client VPN node 50 to access a remote resource, the remote resource name can be resolved by a DNS server on the client VPN node 50 to a local IP address such that the request can be received by the client DVPN gateway 60, acting as a virtual resource 40, which will route the traffic over the tunnel 90 to the resource VPN node 20. It can be appreciated that each of the DVPN gateways 30, 60 will also preferably include information identifying the unique client machine from which the traffic originated.

The client VPN node 50 can include a Domain Name Server (DNS) (not shown) configured to resolve the remote resource name, Web1', to a local IP address and port number, 10.2.0.100:8080. The client VPN node 50 preferably includes a dynamic host configuration protocol (DHCP) server (not shown in FIG. 1) for assigning a local IP address such as, 10.2.0.100:8080, to a remote resource 40 at resource provision step. An IP pool or static IP assignment can also be used for this purpose, which allows the remote resource 40, on the resource VPN node 20, to be accessed as a virtual local resource, on the client VPN node 50, without exposing the resource VPN node's network topology and/or IP addresses. The ability of the resource and the client DVPN gateways 30, 60 to convert and route any request to access a resource within the other VPN node provides added security.

In addition, it can be appreciated that the IP address will also include a port number, wherein the port number is preferably in the form of a TCP and UDP protocols. The port number, which can be present in the header of a data packet, can be used to map data to a particular process running on a client or client machine and an application specific process on a resource (server). For example, if the mail server is used for sending and receiving e-mail within the resource and the client VPN node both will include a simple mail transfer protocol (SMTP) and a post office protocol version 3 (POP3) service, wherein these will be handled by different server processes, and the port number can be used to determine which data is associated with which process.

As shown in FIG. 1, when the client 70 having an IP address of 10.2.0.10 (56) on the client virtual private network node (Site B), requests access to a remote resource 40, e.g., Web service Web1 on the resource virtual private network node 20 (Site A), as though the at least one resource 40 is a local (virtual) resource on the client virtual network node 50 (Site B). Typically, the client 70 on the client virtual private network 50 sends a formatted block of information in the form of a packet (not shown) to the local (virtual) resource, web service Web1', 10.2.0.100:8080 (56), which is received by the client DVPN gateway 60 (Gateway B). The client DVPN gateway 60 routes the packet to the corresponding SSL tunnel 90 after translating the source and destination IP addresses and (optionally port numbers) to internal identifiers and port numbers used among DVPN Gateways 30, 60. The resource DVPN gateway 30 (Gateway A) receives the packet and translates the source and destination identifiers and (optionally port numbers) to local IP addresses and port numbers on the resource virtual private network node 20 (Site A). Then, acting as a (virtual) client on the resource virtual private network node 20 (Site A), the resource DVPN gateway 30 (Gateway A) sends the packet to the real resource, Web service Web1, 10.1.0.200:80 (42). The responses follow the reverse process.

It can be appreciated that utilizing a dynamic VPN with a dual-NAT (network address translation) method can provide more flexibility and powerful mapping methods for secure connections between two end VPN nodes. In addition, by the view of resource publishing type, the dynamic VPN can be divided as application resource, host resource and subnet resource, which can guarantee finer grain and more flexible access control and ease of deployment without worrying about IP address or subnet conflicts between two end sites. For example, application/hosting/subnet resources can benefit as follows:

1. Application Publishing: A specific application resource, such as FTP, can be published from one site to another site, such that the system and method can hide the internal networks and also can provide much finer grain control at application resource level. In addition, an application resource can be defined by its host name (or IP address) and port number(s).

2. Host Publishing: The system and method provides a way to map a whole host to other sites. The IP address or hostname is used to define a host resource.

3. Subnet Publishing: The system and method provides a way to map a subnet to other sites, such that an IP address range can be used to define a subnet resource.

4. In order to hide the network topology of the resource site, a resource name can be assigned at resource publishing (provision) time. This resource name is used at the client site to access the named resource. For Subnet Publishing, a resource name can be mapped to a range of local IP addresses on the client site.

Figure 2:
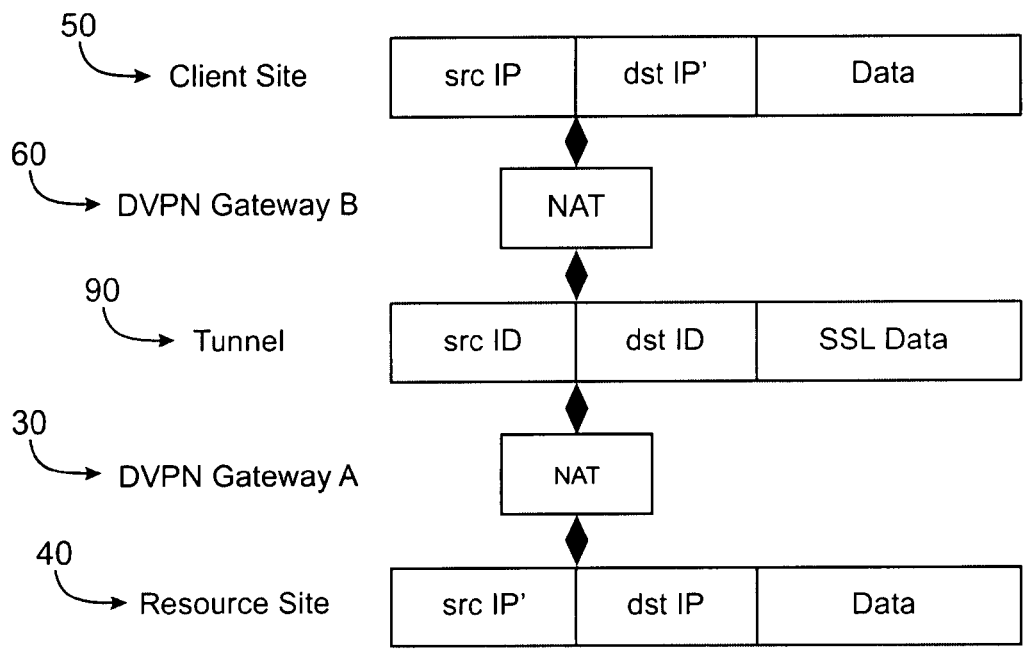
FIG. 2 shows a chart relating to dual-NAT packet encapsulation format in accordance with one embodiment.

FIG. 2 shows a chart relating to dual-NAT packet encapsulation format in accordance with one embodiment. Dual NAT (network address translation) method can provide communication functions for a dynamic VPN system, wherein the DVPN gateways 30, 60 handle the packets at the IP packet level. As shown in FIG. 2, the IP packets will be encapsulated as payload in the SSL tunnel 90 after source (src) and destination (dst) addresses and (optionally) port numbers are translated. On the other end of tunnel 90, the IP packets will be decoded from the SSL tunnel 90 and will be routed to the at least one resource (real) 40 after another address translation. To support the unique source ID and destination ID, each DVPN gateway 30, 60 will preferably maintain a range of unique addresses. The ranges of unique addresses are preferably known or called DVPN addresses to differentiate them from the local IP addresses used on the resource private network node 20 (Site A) and the client virtual private network node 50 (Site B). Also, it can be appreciated that the DVPN addresses will preferably be selected such that the DVPN addresses are only meaningful and used among DVPN gateways 30, 60 for routing packets through the SSL tunnels.

As shown in FIG. 2 (and FIG. 1), the client 70 issues a request for a resource 40 within the client virtual private network node 50 in the form of an IP packet having a source IP (src IP), a destination IP address (dst IP') and Data, which is received by the client DVPN gateway 60 (Gateway B). The source IP (src IP) address is the client IP address on the client VPN node 50 and the destination IP (dst IP') address is the (virtual) resource IP address on the client VPN node 50. The client DVPN gateway 60 performs a network address translation (NAT) or re-writing of the source and/or destination addresses of the IP packet to a unique source ID (src ID), a unique destination ID (dst ID) and SSL data, which is routed to the resource DVPN gateway 30 (Gateway A). The resource DVPN gateway 30 then translates the IP packet to a source IP (src IP'), a destination IP (dst IP) address and unencrypted Data. The source IP (src IP') address is the (virtual) client IP address on the resource VPN node 20 and the destination IP (dst IP) address is the resource IP address on the resource VPN node 20.

Figure 3:
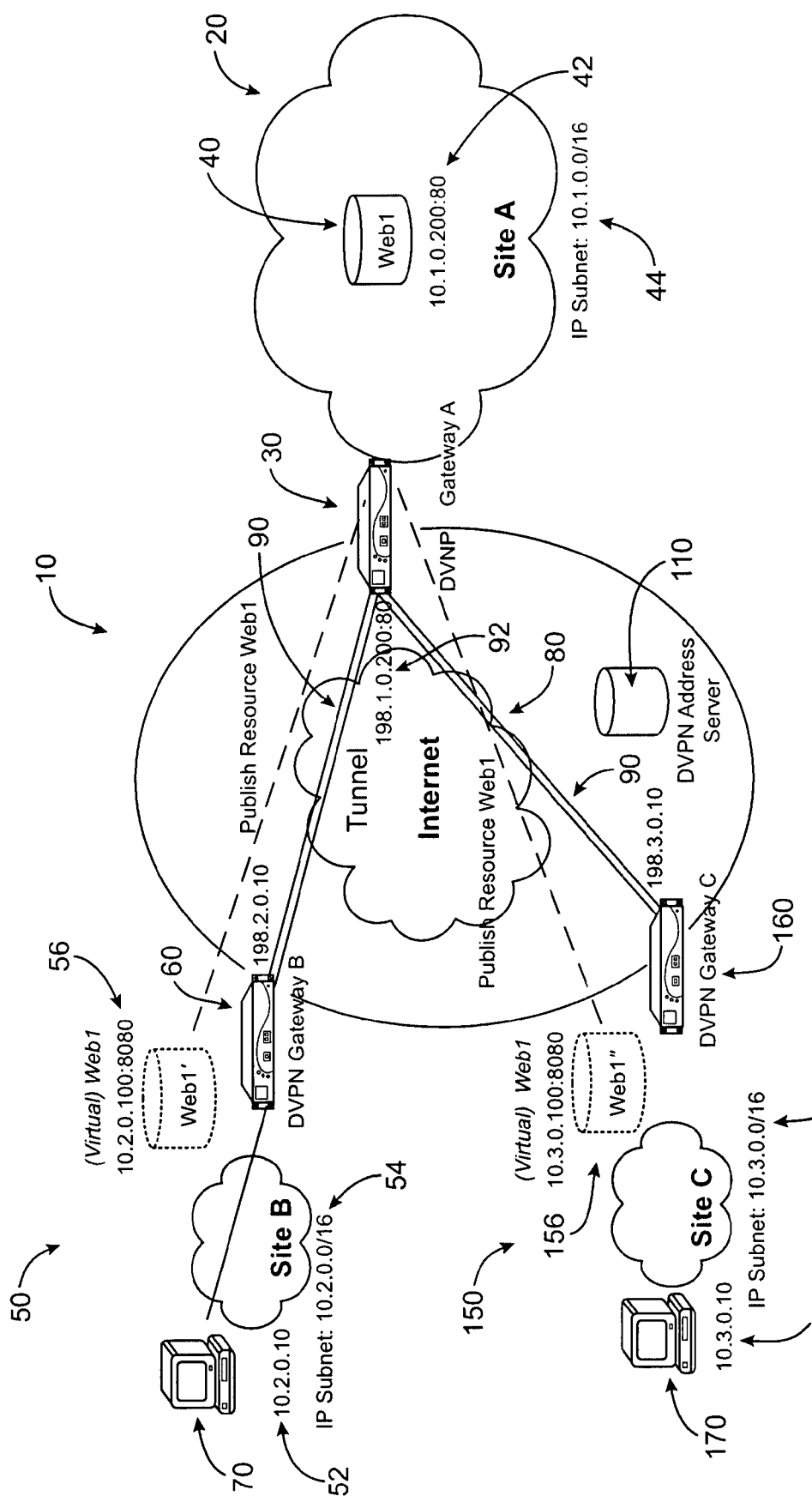
FIG. 3 shows a schematic diagram of a dynamic virtual private network (DVPN) architecture for remote resource access between two peer virtual private network (VPN) nodes using DVPN addresses.

FIG. 3 shows a schematic diagram in accordance with one embodiment of the dynamic VPN architecture for remote resource access between two peer VPN nodes using DVPN addresses. As shown in FIG. 3, at the resource publishing (provisioning) time, the resource site DVPN gateway 30 (Gateway A) will assign a unique DVPN address to the at least one resource 40, 198.1.0.200:80 (92) for Web1 on the resource virtual private network node 20 (Site A with IP subnet 10.1.0.0/16), from the gateway's DVPN address pool. It can be appreciated that in the case where the at least one resource 40 is provisioned to multiple client sites 50, 150, (e.g., Site B and Site C, with IP subnet 10.2.0.0/16 and 10.3.0.0/16) the same DVPN address can be used. In accordance with one embodiment, the at least one resource 40 on the resource VPN node 20 (Site A) can be published by name and/or local IP address and port number. For resources 40, which are published by name, the resource side DVPN gateway 30 will preferably locate the actual IP address of the at least one resource 40 through a reverse domain name service (DNS) search.

At the session initiation, the client site DVPN gateway 60 (Gateway B) will preferably assign a unique DVPN address to the client 70, e.g. 198.2.0.10 from its DVPN address pool. The unique DVPN address will be used by the client DVPN gateway 60 (Gateway B) for all remote resource accesses by the same client 70. In the process of assigning a DVPN address to a resource 40 or a client 70, a new port number can optionally also be assigned to the DVPN address. In accordance with one embodiment, a pool of DVPN addresses can be assigned manually to each DVPN gateway or dynamically acquired from a server (110) with dynamic host configuration protocol (DHCP) similar function. Each range of DVPN addresses can be identified with a specific DVPN gateway 30, 60, 160. It can be appreciated that industry standard IP routing protocol, such as open shortest path first (OSPF) and border gateway protocol (BGP), can be used to route packets among a group of DVPN gateways 30, 60, 160.

In the embodiment, the original local client IP address on the client site 50, 150 can be used as a client's 70, 170 DVPN address. However, it can be appreciated that the original client IP address is preferably used only between DVPN gateways 30, 60, 160 and preferably is not exposed on the resource VPN node 20 (Site A). Alternatively, the original local resource IP address can be used as a resource DVPN address, wherein the original local resource IP address is used only between DVPN gateways 30, 60, 160, such that the local resource IP address will not be exposed on the client VPN nodes 50, 150 (Site B, Site C).

In the embodiment, both the original client and the resource IP addresses can be used without any network address translation (NAT) or "Natting." In this case, the system and/or method requires no IP address conflict between the client and the resource VPN nodes. Also, it can be appreciated that in this case, the system and/or method can not hide the internal network topology.

In accordance with one embodiment, a system or method utilizing the dual-NAT (network address translation) method provides network address translation on both the client site and the at least one resource site. In addition, it can be appreciated that the network address translation rules (i.e., NAT rules) applied to both the client site or the at least one resource site are generally not totally identical, such that the NAT rules are called Client Site NAT Rule and Resource Site NAT Rule, respectively.

For the Client site NAT rule: On the session initiation site (i.e., typically the client Site), the Client Site NAT rule is used to translate the destination (virtual resource) address to a specific destination DVPN address (e.g., 10.2.0.100:8080=>198.1.0.200:80, FIG. 3) which is part of DVPN address pool of the resource site DVPN gateway 30 (Gateway A). The source (client) address is also translated to a specific source (client) DVPN address (10.2.0.10=>198.2.0.10, FIG. 3.) which is part of the DVPN address pool of the client site DVPN gateway 60 (Gateway B). For a reply from the resource site 30, the specific source (resource) DVPN addresses will be translated back to the local (virtual) resource IP addresses/port numbers and the destination (client) DVPN addresses will translated to the client's IP address on Client site before routing to the client 70.

For the Resource Site NAT rule: When the resource site DVPN gateway 30 (Gateway A) receives the translated IP packets from the SSL tunnel 90, the resource site DVPN gateway 30 translates the destination (resource) DVPN address of the received packets to the real resource's IP address (198.1.0.200:80=>10.1.0.200:80, FIG. 3) and selects a suitable local IP address, on the resource site 20, either from an IP range or from a DHCP server as the source IP address, for the client (198.2.0.10=>10.1.0.101). After translation, the packets are routed to the real resource 40, such that the resource site NAT rule obtains the real (or local) resource's destination IP address and selects a suitable (local) source IP address for the client 70. For a reply packet received from the resource 40, the resource site DVPN gateway 30 translates the source address to the specific DVPN address of the resource 40 and the destination address to the specific DVPN address of the client 70 before routing the packet to the Client Site DVPN gateway 60 (Gateway B).

In accordance with one embodiment, the dynamic VPN dual-NAT method can be used to translate the source and the destination addresses and port numbers, i.e., Full NAT/PAT (network address translation/port address translation), NAT (network address translation) Only, or Transparent (i.e., no NAT or PAT).

1. Full NAT/PAT: When a resource is provisioned with a new local IP address and port number on a client site, the client site and the resource site DVPN gateways work together to translate the IP address and port number on the client site to the IP address and port number on the resource site. For a Client, the IP address and port number are changed in the address translation on the resource site DVPN Gateway. It can be appreciated that in accordance with this embodiment, a pre-selected fix local IP address on the resource site can be used for a plurality of client connections and does not need to be allocated to different IP address for each and every connection. However, a new port number is selected and assigned to each and every connection to maintain the uniqueness of each client connection. This method is similar to the traditional PAT (Port Address Translation) or Full NAT (i.e., Full NAT/PAT). It can be appreciated that the full NAT/PAT system and method can use IP address more efficiently and need not to reserve or consume too many IP addresses on the resource site.

2. NAT Only: In the address translation, only the IP address is changed and the port number remains unchanged. Using this method, the port number for an application will not be changed. For every new connection from a client will require a new IP address on the resource site. This method is identical to the traditional NAT. In this embodiment, the method and system is referred to as "NAT Only" since the method and system does not change the port number from a client. This method provides an easy way to handle some complex application protocols, such as remote procedure call (RPC), in which protocol port number (only port number, not IP address) is contained in the payload. In such cases, the packets do not need to parse the payload in order to support it because the port numbers are not changed.

3. Transparent: Using this method, both client and resource site DVPN Gateways do not change the IP addresses and port numbers at all. It means the packets from a client are encapsulated as a payload without any address translation. So the resource site DVPN Gateway does not need to translate the address either. This method is more like the traditional site-to-site technology, since this method and system require no IP address conflict in all the sites and furthermore can not hide the internal network topology.

It can be appreciated that in the application resource publishing, a resource can be a static port or dynamic port application. Generally, a static port application only uses one static port which can be the same as the original port number or a new port number. However, a dynamic port application is more complicated because a new port number is dynamically negotiated in the process of data transfer. It can be appreciated that because the new port number is dynamically negotiated, the payload of data will be parsed, per application protocol, to find out the negotiated port number for Full NAT/PAT. For example, file transfer protocol (FTP) is a typical dynamic port application.

With all the above methods, Dynamic VPN technology can have several potential combinations, including:

For Resource Address at the Client Site
Application Publishing/Static Port: Full NAT/PAT
Application Publishing/Dynamic Port: Full NAT/PAT
Application Publishing/Static Port: NAT Only
Application Publishing/Dynamic Port: NAT Only
Application Publishing: Transparent
Host Publishing: Full NAT/PAT
Host Publishing: NAT Only
Host Publishing: Transparent (requires no IP conflict)
Subnet Publishing: Full NAT/PAT
Subnet Publishing: NAT Only
Subnet Publishing: Transparent (requires no IP conflict)
For Client Address on the Resource Site:
Full NAT/PAT
NAT Only
Transparent It can be appreciated that generally, broadcast and multicast packets require special consideration in a dynamic VPN system or method because the dynamic VPN is designed to hide the internal network topology. However, since many applications require broadcast and/or multicast traffic, broadcast and multicast support will typically be required.

For a broadcast, the case of subnet publishing should be considered. In this case, both client site and resource site NAT modules need to translate the address in the broadcast packets. In accordance with one embodiment, implementation can include the client side DVPN gateway, wherein the system and/or method defines a way to tell the resource side DVPN gateway not only which the resource site resource is these packets targeted for but also the packets are broadcast packets. The resource site DVPN gateway also needs to re-construct the broadcast packets based on the resource information. The system and method can also consider adding command to control whether the DVPN gateway needs to forward the broadcast packets.

In the case of a multicast, the system and/or method only need to support a multicast in case of subnet publishing and the multicast groups in which the packets are forwarded. On the Client site gateway, in accordance with one preferred embodiment, the system and/or method is configured to listen to a 224.0.0.22 multicast address (222.0.0.22 is the address in which members typically send, join, and leave IGMP messages). However, it can be appreciated that any suitable address can be used. In accordance with another embodiment, when a computer or other suitable device on the Client site joins a group, the Internet group management protocol (IGMP) request can be parsed and recorded by the client site gateway. At the same time the IGMP request should be forwarded to the Resource site gateway so the resource site gateway can forward future multicast messages to that group and the corresponding Client site. In accordance with another embodiment, when the Client site gateway receives the multicast messages, the Client site gateway should only forward to hosts that have joined the multicast group.

A few typical Dual NAT cases are illustrated below:

Case 1: Full NAT/PAT for Resource and Client Addresses:

FIG. 4 shows a table relating to an informational setup of a Network Address Translation (NAT)/Port Address Translation (PAT) Rule for remote resource service deployment between two peer VPN nodes in accordance with one embodiment. As shown in FIG. 3, resource web1 is published from Resource site 20 (Site A) to the Client site 50 (Site B) with a virtual resource web1' address of 10.2.0.100:8080 on the Client site 50. The Client 10.2.0.10 will access the remote web service Web1 10.1.0.200:80 via the DVPN gateways 30, 60 (Gateway A and B). As shown in FIG. 4, the Client site DVPN Gateway B selects a DVPN address, 198.2.0.10:2000, for the client 70. The client site DVPN gateway 60 (Gateway B) also translates (NAT) the destination IP address and port number 10.2.0.100:8080 to the resource's DVPN address and port number 198.1.0.200:80. The DVPN address of the resource, 198.1.0.200, is preferably assigned by the DVPN gateway 30 (Gateway A) at the resource publishing time. On the Resource site DVPN gateway 30 (Gateway A), a reserved (or fixed) IP address, 10.1.0.101, is used and a unique port number 10001 is selected to guarantee the uniqueness for the client's connection. The reserved IP address can be manually assigned or acquired from a reserved IP pool and is used for all client accesses. A new port number is selected to guarantee the uniqueness of each new client connection.

Case 2: NAT Only for Client Address:

FIG. 5 shows a table relating to NAT Only Rule for the remote resource access packet flow between two peer VPN nodes in accordance with the embodiment. On the Resource site DVPN gateway 30 (Gateway A), the source (client) port number 2000 is unchanged in the address translation. Accordingly, each and every connection requires a new local IP address such as 10.1.0.102. These IP addresses can be acquired from a DHCP server or from a reserved IP pool.

It can be appreciated that the NAT Only for a Client Address (Case 2) is different from the Full NAT/PAT for a Client Address (Case 1) since the resource site DVPN gateway 30 (Gateway A) will allocate a new IP address such as 10.1.0.102 with the port number 2000 unchanged for each and every new client connection. For Case 1, the resource site DVPN gateway 30 (Gateway A) uses the same reserved IP address 10.1.0.101 and selects a new port number 10001 for each and every new client connection.

Figure 6:
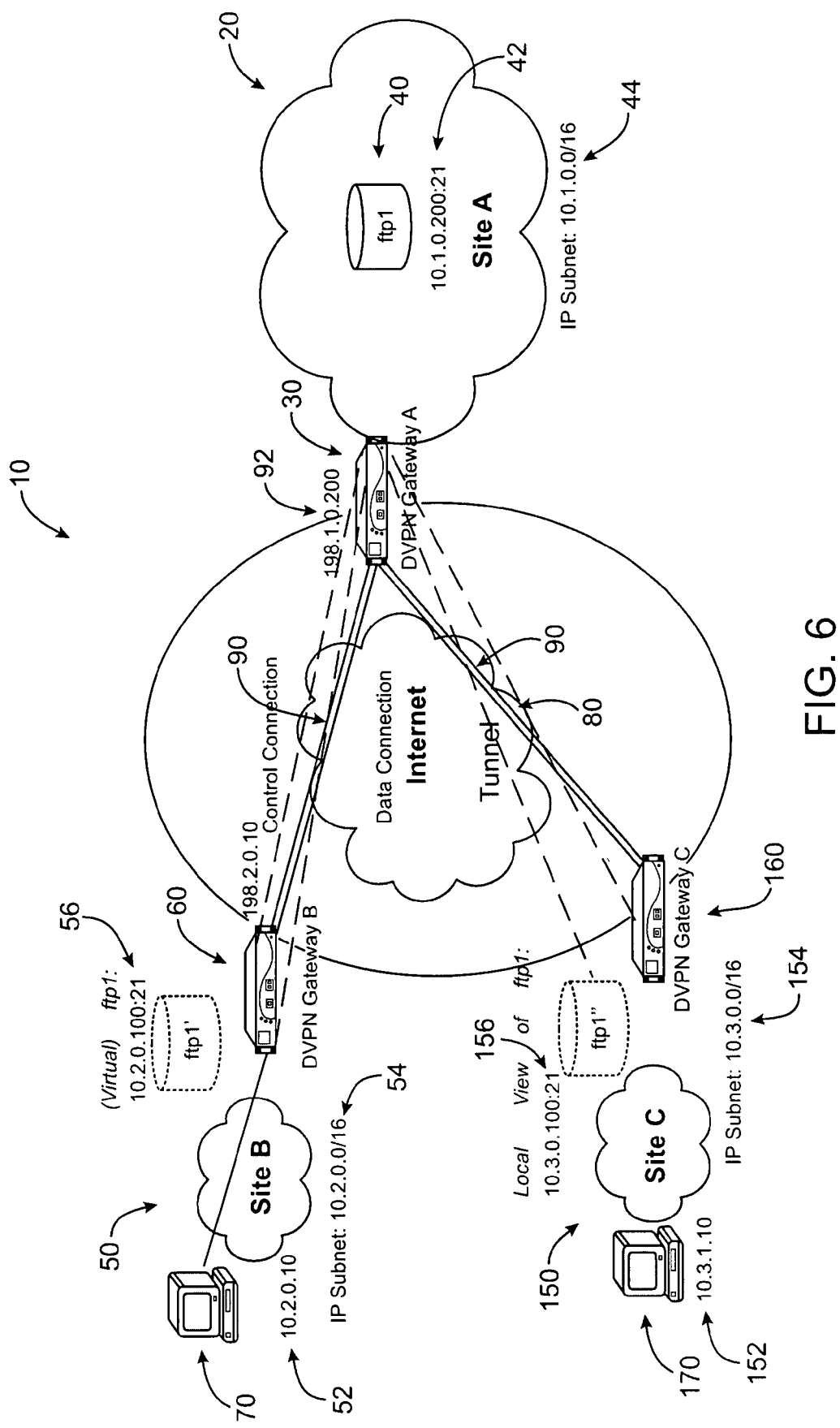
FIG. 6 shows a schematic diagram of a dynamic VPN (DVPN) architecture between peer VPN nodes having application resources, such as FTP, using a dynamic port protocol.

Case 3: Application Using Dynamic Port:

FIG. 6 shows a schematic diagram of a dynamic VPN (DVPN) architecture between peer VPN nodes having application resources using a dynamic port protocol, such as FTP. The complete Dynamic VPN access process preferably includes the steps of establishing a secure tunnel and publishing at least one resource. The establishment of the secure tunnel 90 can include the establishment of an SSL connection between the Resource site 20 and the Client site 50 (Site A and Site B), wherein the tunnel 90 is used to transmit control and data packets. The resource publishing (or provisioning) can include publishing (provisioning) a resource, e.g., FTP server ftp1 (with real resource IP address 10.1.0.200) on Resource site 20 (Site A), to the Client site 50 (Site B) through the secure connection 90 preferably in the form of a SSL connection.

As shown in FIG. 6, the Client site 50 (Site B) obtains the real resource information and allocates a local IP address (10.2.0.100) to this resource using DHCP, a pre-configured IP pool, or other suitable method, such that the remote resource is mapped as a local (virtual) resource on the Client site 50

(Site B). For convenience, it can be appreciated that the site which publishes resources to other sites (in this case, Site A) as "Resource site" and the site which receives resources from other site (in this case Site B) as "Client site". The "Client" is the real client and "Resource" is the real server.

The Client, with an IP address of 10.2.0.10 on Client site 50 (Site B), can access a remote resource, FTP server ftp1 on Resource site 20 (Site A), as though it is a local (virtual) resource on Client site 50 (Site B) as follows:

1. Client on Client site 50 (Site B) sends packets to the local (virtual) resource, ftp1' 10.2.0.100:21 (56);

2. Acting as the (virtual) resource, the DVPN gateway 60 (Gateway B) receives the packets. The DVPN gateway 60 (Gateway B) routes the packets to the corresponding SSL tunnel after translating their source and destination IP addresses and (optionally port numbers) to DVPN addresses and port numbers used among the DVPN gateways 30, 60;

3. DVPN gateway 30 (Gateway A) receives the packets and translates their source and destination DVPN addresses and (optionally port numbers) to local IP addresses and port numbers on the Resource site 20 (Site A). Then, acting as a (virtual) Client on Resource site 20 (Site A), the DVPN gateway 30 (Gateway A) sends the packets to the real resource, FTP server ftp1 10.1.0.200 (40); and 4. Responses follow the reverse process.

As shown in FIG. 6, the system 10 comprises a Resource site 20 (Site A) having at least one resource 40, and a dynamic virtual private network (DVPN) gateway 40 associated with the resource VPN node 20 (Site A). The system 10 also includes a client dynamic virtual private network (DVPN) gateway 60 associated with a client VPN node 50 (Site B) having at least one client or client machine 70, and optionally another dynamic virtual private network (DVPN) gateway 160 associated with another VPN node 150 (Site C) having at least one client or client machine 170. Theses three DVPN gateways 30, 60, 150 work together to deploy any resource 40 for a client 70, 170 to remote access without disclosing the local internal network topologies of theses three VPN nodes 20, 50, 150 (Site A, Site B, and Site C). These three VPN nodes 20, 50, 150 are preferably configured to securely communicate with one another, using the virtual private network gateways 30, 60, 160 on each end, via a communication network 80 (i.e., the Internet). Although not shown, it can be appreciated that the VPN nodes 50, 150 can be configured to securely communicate with one another using the virtual private network gateway 60, 160. Further, it can be appreciated that the client VPN nodes 50, 150 (Site B and Site C) can be configured to host at least one resource 40, such that the resource VPN node 20 (Site A) can also be a client node, and the client node can be utilized as a resource node.

Figure 7:
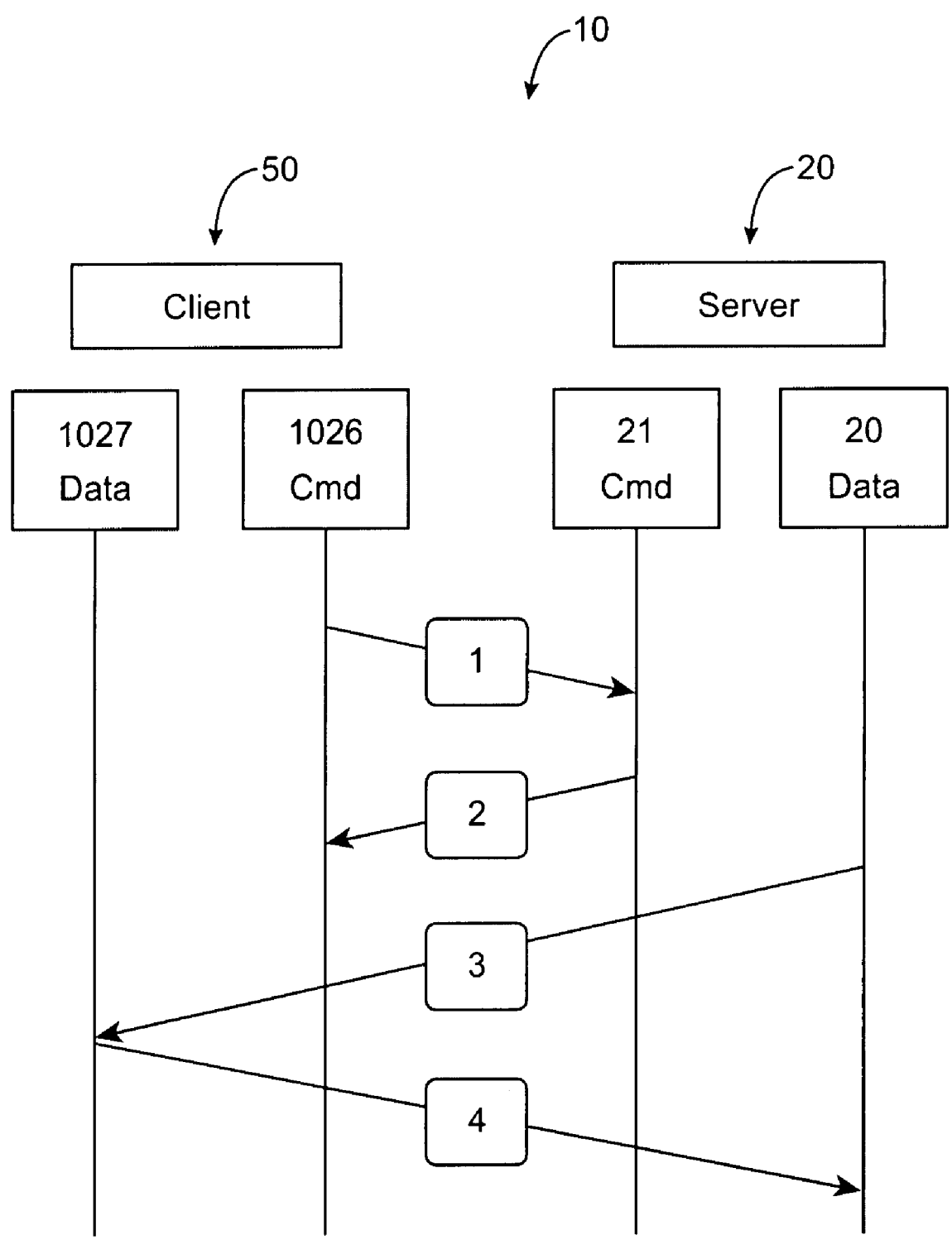
FIG. 7 shows a flow chart relating to Active Mode File Transfer Protocol (FTP) between a Client and an FTP Server.

FIG. 7 shows a flow chart relating to active mode file transfer protocol (FTP or ftp) between a Client and an FTP Server. In step 1, the Client's command port 1026 contacts the Server's command port 21 and sends the PORT 1027 command packet. The Server then sends an ACK (acknowledgment) back to the Client's command port 1026 in step 2. In step 3 the Server initiates a connection on it local data port 20 to the Client's data port specified in the PORT 1027 command. Finally, the Client sends an ACK back as shown in step 4.

FIG. 8 shows a table relating to the PORT command packet sending from the Client to the FTP Server. In FIG. 8, the bold arrow line indicates the direction of the PORT 1027 command packet sent from the Client 70 to the FTP Server 40 (in FIG. 6). As shown in FIG. 8, the client site packet having a source IP address of 10.2.0.10 and a port number of 1026 and a destination IP address and port number of 10.2.0.100:21. The client site DVPN gateway 60 (Gateway B) translates (NAT) the Client IP address, 10.2.0.10:1026 to an assigned client DVPN address, 198.2.0.10:1026, for the client 70. The client site DVPN gateway 60 (Gateway B) also translates (NAT) the destination IP address and port number 10.2.0.100:21 to the FTP Server DVPN address and port number 198.1.0.200:21 and routes it through the tunnel 90 to the Resource DVPN gateway 30 (Gateway A). The FTP Server DVPN address, 198.1.0.200, is preferably assigned by the DVPN gateway 30 (Gateway A) at the resource publishing time. On the Resource site, DVPN gateway 30 (Gateway A) translates (NAT) the Client DVPN address, 198.2.0.10:1026 to a reserved (or fixed) IP address, 10.1.0.101, and a unique port number 15000 to guarantee the uniqueness for the client's connection on the virtual private network node Site A. It can be appreciated that the reserved IP address can be acquired from a reserved IP pool or manually assigned. The DVPN gateway 30 (Gateway A) also translates the FTP Server DVPN address 198.1.0.200:21 to its local IP address, 10.1.0.200:21, on the virtual private network node Site A and then, sends the packet to the real FTP server on the behalf of the Client on the virtual private network node Site B.

FIG. 9 shows a table relating to NAT the content of the PORT command packet as Step 1 in FIG. 7. For example, if the client selects 10.2.0.10:1027 as an IP address and port number in the PORT command packet, the IP address 10.20.10:1027 is translated by the Client DVPN gateway 60 (Gateway B) to 198.2.0.10:1027 and routed via a secure connection or tunnel 90 to the DVPN gateway 30 (Gateway A). The Resource DVPN gateway 30 (Gateway A) translates the DVPN address, 198.2.0.10:1027, to 10.1.0.101: 15001, wherein 10.1.0.101 is a reserved IP address, and 15001 is a unique (data) port number for the client on the virtual private network node Site A, records 198.2.0.10:1027 relating to control connection 198.1.0.200:21, and listen on 10.1.0.101: 15001 for connection set up from the FTP Server. It can be appreciated that all of the IP addresses and unique port numbers are merely examples, and the IP addresses and unique port numbers can be changed without departing from the present invention.

FIG. 10 shows a table relating to the packet flow from the FTP Server data port 20 to the Client data port 1027 (Step 3 in FIG. 7). As shown in FIG. 10, the FTP Server initiates a connection on it local data port 20 to the (virtual) Client's data port 15001 which is translated to real client IP address and port number 10.2.0.10:1027 via the DVPN gateways 30, 60 (Gateway A and Gateway B). As shown in FIG. 10, the DVPN gateway 30 (Gateway A) performs network address translation (NAT) of the source IP address and Port number, 10.1.0.200:20 to the FTP Server DVPN address, 198.1.0.200: 20, and the destination IP address and port number, 10.1.0.101:15001, to the Client DVPN address, 198.2.0.10: 1027 and routes the packet via a secure connection or tunnel 90 to the DVPN gateway 60 (Gateway B). Then, the DVPN gateway 60 (Gateway B) performs network address translation (NAT) of the source DVPN address and port number, 198.1.0.200:20 to a local (virtual) resource IP address 10.2.0.100:20 and the destination DVPN address, 198.2.0.10: 1027 to a local client IP address, 10.2.0.10:1027, on the virtual private network node Site B. Then, DVPN gateway 60 (Gateway B) sends the packet, on the behalf of the FTP Server, to the Client on the virtual private network node Site B.

Figure 11:
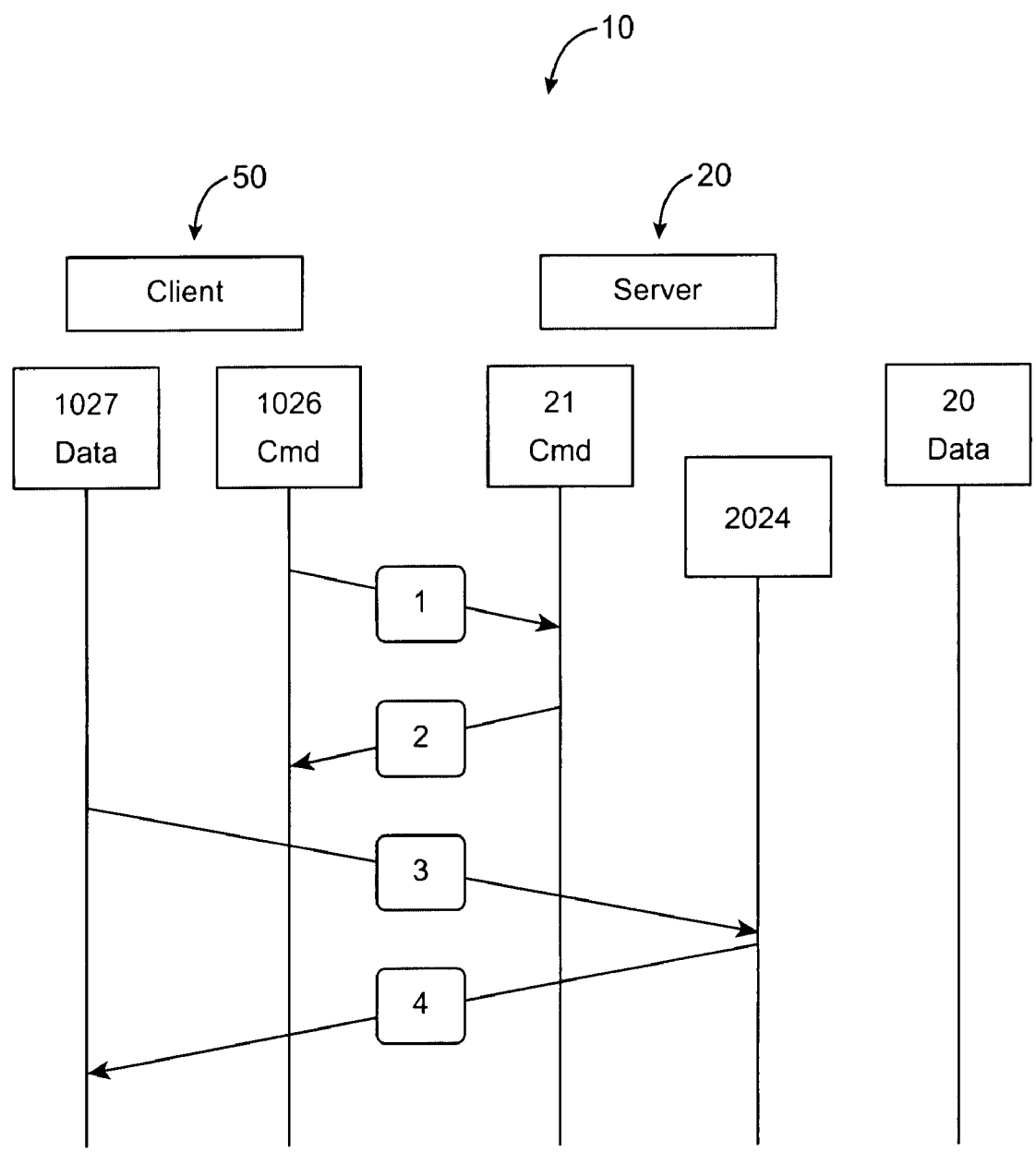
FIG. 11 shows a flow chart relating to Passive Mode File Transfer Protocol (FTP) between a Client and an FTP Server.

FIG. 11 shows a flow chart relating to passive mode file transfer protocol (FTP or ftp). In step 1, the Client contacts the FTP Server on the command port 1026 and issues the PASV command packet. The FTP Server then replies in step 2 with PORT 2024 command packet, telling the Client which port it is listening to for the data connection. In step 3, the Client then initiates the data connection from its data port 1027 to the specified server data port 2024. Finally, the Server sends back an ACK in step 4 to the Client's data port 1027.

FIG. 12 shows a table relating to the PASV command packet from the Client to the FTP Server as Step 1 in FIG. 11. The bold arrow line indicates the direction of PASV command packet routed from the Client to the FTP Server.

As shown in FIG. 12, the client sends the PASV command packet from its command port 1026, 10.2.0.10:1026 as the source IP address and port number. The IP address 10.20.10:1026 is translated (NAT) by the DVPN gateway 60 (Gateway B) to the DVPN address 198.2.0.10:1026. The DVPN gateway 60 (Gateway B) translates the destination IP address and port number 10.2.0.100:21 to the FTP Server DVPN address, 198.1.0.200:21, and routes via a secure connection or tunnel 90 to the DVPN gateway 30 (Gateway A). The DVPN gateway 30 (Gateway A) translates the source DVPN address, 198.2.0.10:1026, to 10.1.0.101:15000, wherein 10.1.0.101 is a reserved IP address and 15000 is a unique port number for the client (Full NAT/PAT) on the VPN node Site A. The DVPN gateway 30 (Gateway A) also translates the destination DVPN address 198.1.0.200:21 to the FTP Server local IP address, 10.1.0.200:21 on the VPN node Site A. It can be appreciated that all of the IP and DVPN addresses and unique port numbers are merely examples, and the IP and DVPN addresses and unique port numbers can be changed without departing from the present invention.

FIG. 13 shows a table relating to NAT the content of the PORT command packet as Step 2 in FIG. 11. As shown in FIG. 13, the FTP Server sends a PORT command packet with port number 2024 in it. The DVPN gateway 30 (Gateway A) translates the IP address and port number, 10.1.0.200:2024, in the PORT command packet, to FTP Server DVPN address 198.1.0.200:2024, records 10.1.0.200:2024 relating to 10.1.0.200:21, and waits for packets to 198.1.9.200:2024 from the Client. The DVPN gateway 60 (Gateway B) translates DVPN address 198.1.0.200:2024 in the PORT command packet to FTP Server local (virtual) IP address 10.2.0.100:2024 on the virtual private network node Site B, records 10.2.0.100:2024 relating to 10.2.0.100:21 control channel, and listens on 10.2.0.100:2024 from the Client.

FIG. 14 shows a table relating to the Client initiating a data connection to the FTP Server as Step 3 in FIG. 11. As shown in FIG. 14, the Client sends a packet from its data port 1027, with its local IP address 10.2.0.10, to the FTP server data port 2024, with its local (virtual) IP address 10.2.0.100:2024 on the virtual private network node Site B. The DVPN gateway 60 (Gateway B) translates the Client IP address to an assigned DVPN address, 10.2.0.10:1027 to 198.2.0.10:1027, and the (virtual) FTP Server IP address to its DVPN address, 10.2.0.100:2024 to 198.1.0.200:2024, and routes it to the DVPN gateway 30 (Gateway A) via a secure connection or the tunnel 90. The DVPN gateway 30 (Gateway A) translates the Client DVPN address 198.2.0.10:1027 to a reserved IP address 10.1.0.101 and a new port number 15001 which is related to the port number 15000 on the virtual private network node Site A. The DVPN gateway 30 (Gateway A) also translates the FTP Server DVPN address 198.1.0.200:2024 to its local IP address 10.1.0.200:2024 on the virtual private network node Site A.

It can be appreciated that in accordance with the embodiment, with the proper resource provisioning, a remote resource 40 (on Resource Site or Site A (20)) can be published to an intermediate Site Z and acquires a local IP address/port number on Site Z. Then, Site Z can publish this virtual resource to a third site, e.g., Site B and/or Site C. The above described Dual NAT method allows a client on Site B and/or Site C to securely access the resource on Site A via multiple intermediate Sites.

Alternative embodiments of the invention also may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A method for virtual private network packet level routing using a dual-NAT (network address translation) mechanism comprising:

hosting a list of available resources on a resource virtual private network, and wherein each of the available resources has a local (actual) resource IP address;

dynamically assigning each of the available resources on the resource virtual private network a resource dynamic virtual private network (DVPN) address using a Dynamic Host Configuration Protocol (DHCP);

publishing the list of available resources to at least one client virtual private network gateway using the resource DVPN address for each of the available resources;

translating the resource DVPN address for each of the available resources into a local (virtual) resource IP address on the at least one client virtual private network;

providing the local (virtual) resource IP address for the list of available resources to at least one client on the at least one client virtual private network;

initiating a request by the at least one client for the at least one resource from the list of available resources hosted on the resource virtual private network as though the at least one resource is local to the at least one client without exposing the local (actual) resource IP addresses of the list of available resources on the resource virtual private network, each of the at least one clients having a local (actual) client IP address, and wherein the client DVPN gateway associated with the client virtual private network dynamically assigns the local (actual) client IP address into a client DVPN address using a Dynamic Host Configuration Protocol (DHCP) and translates the local (virtual) resource IP address into the resource DVPN address;

routing the request packet with the client DVPN address and the resource DVPN address through a secure connection to a resource dynamic virtual private network (DVPN) gateway associated with the resource virtual private network;

translating the client DVPN address and the resource DVPN address into a local (virtual) client IP address and the local (actual) resource IP address on the resource virtual private network, and wherein the translation is performed by the resource DVPN gateway;

responding to the request by the at least one resource on the resource virtual private network as though the request is initiated locally on the resource virtual private network without exposing the actual IP address of the at least one client on the client virtual private network;

routing the response packet from the at least one resource on the resource virtual private network back to the at least one client on the client virtual private network through the secure connection, wherein the resource DVPN gateway translates the local (actual) resource IP address and the local (virtual) client IP address on the resource virtual private network to the resource DVPN address and the client DVPN address for routing through the secure tunnel to the client DVPN gateway; and forwarding the response packet to the at least one client, wherein the client DVPN gateway translates the resource DVPN address and the client DVPN address into the local (virtual) resource IP address and the local (actual) client IP address on the client virtual private network.

2. The method of claim 1, wherein the client DVPN gateway and the resource DVPN gateway maintain a range of DVPN addresses, which are dynamically assigned as the resource DVPN address and the client DVPN address.

3. The method of claim 2, wherein the resource DVPN address and the client DVPN address are different from the local IP addresses used on the resource and client virtual private networks such that the range of DVPN addresses are only meaningful and used among the client and resource DVPN gateways for routing a packet through the secure connection between the resource virtual private network and the client virtual private network.

4. The method of claim 2, wherein the DVPN address ranges are assigned dynamically from a server associated with each DVPN gateway.

5. The method of claim 1, wherein the resource DVPN gateway assigns the resource DVPN address to the at least one resource from its pool of DVPN addresses upon publishing the at least one resource to the client virtual private network.

6. The method of claim 5, wherein the resource DVPN address of the at least one resource is selectively published to each of the client DVPN gateways for accessing the at least one resource by a client.

7. The method of claim 1, wherein the client DVPN gateway dynamically assigns the client DVPN address to the at least one client upon initiation of the request to access the at least one resource.

8. The method of claim 7, wherein the client DVPN address will be used by the client DVPN gateway for all remote resources accessed by the at least one client.

9. The method of claim 1, wherein the client IP addresses and the resource IP address further include a port number.

10. The method of claim 9, wherein a plurality of local (virtual) client IP addresses on the resource virtual private network share the same IP address with different port numbers, and further wherein the resource DVPN gateway translates the client DVPN addresses and port numbers.

11. The method of claim 9, wherein a plurality of local (virtual) resource IP addresses on the client virtual private network share the same IP address with different port numbers, and further wherein the client DVPN gateway translates the resource DVPN addresses and port numbers.

12. The method of claim 1, wherein the client and the resource DVPN gateways perform packet content rewrite to translate embedded IP addresses and port numbers to support certain application protocols.

13. The method of claim 1, wherein the at least one client accesses the at least one resource through a plurality of intermediate virtual private networks with a DVPN gateway associated with each of the plurality of intermediate virtual private networks.

14. The method of claim 1, wherein the at least one client comprises a plurality of clients on the client virtual private network, and wherein the plurality of clients access a plurality of resources on the resource virtual private network.

15. The method of claim 1, wherein packets with DVPN addresses are routed among a plurality of DVPN gateways using an IP routing protocol.

16. The method of claim 12, wherein the application protocol is a File Transfer Protocol (FTP).

17. The method of claim 15, wherein the IP routing protocol is OSPF or BGP.

18. The method of claim 1, wherein the client and the resource DVPN gateways perform packet content rewrite to translate embedded IP addresses and/or embedded IP addresses and port numbers.

19. The method of claim 1, wherein each of the resource DVPN addresses is assigned by a resource dynamic virtual private network (DVPN) gateway associated with the resource virtual private network.

20. The method of claim 1, wherein the resource DVPN address and client DVPN address each include a port number.

* * * * *